April 2, 1935.   J. H. LANGENFELD   1,996,297
ELECTRIC BARBECUE
Filed April 27, 1933   3 Sheets-Sheet 1

Inventor
John H. Langenfeld
By his Attorneys
Williamson & Williamson

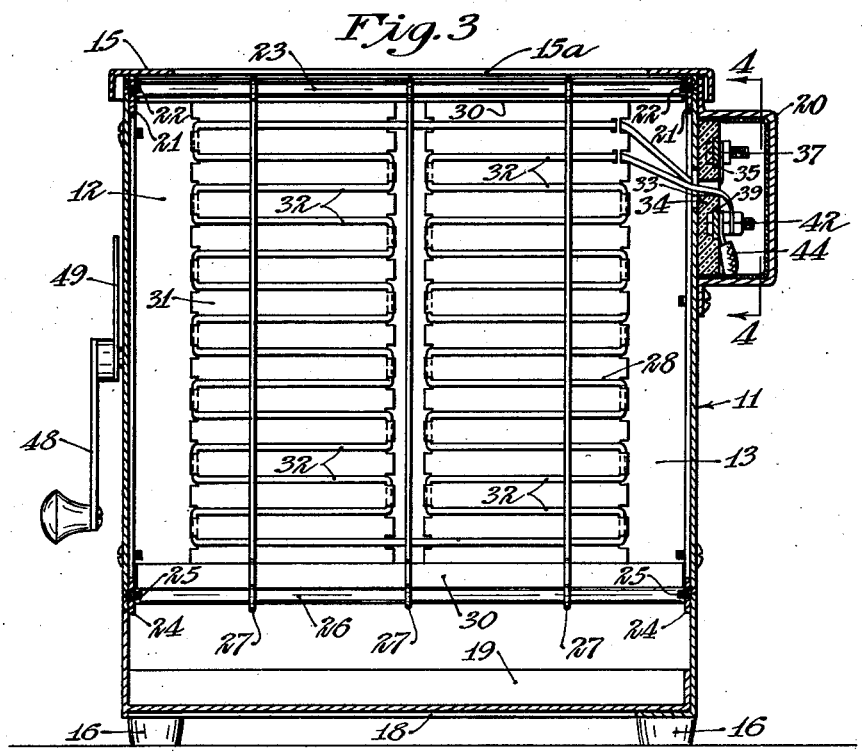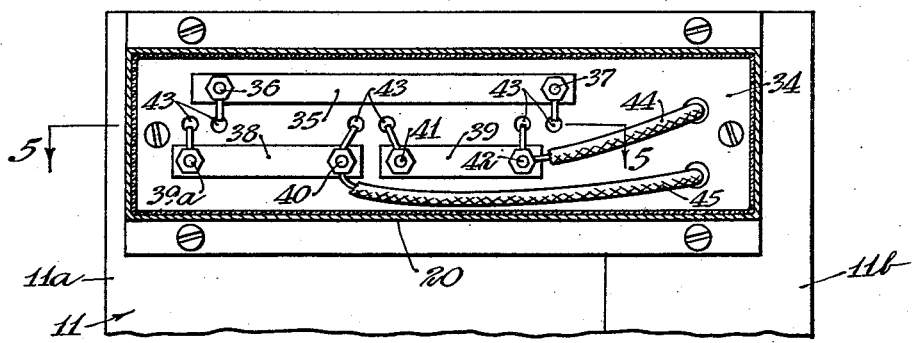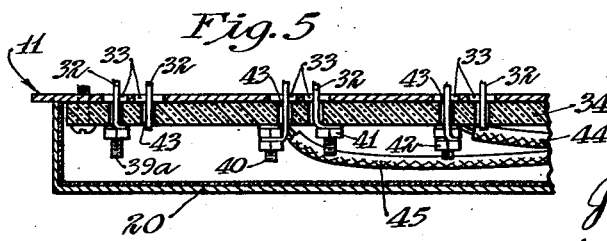

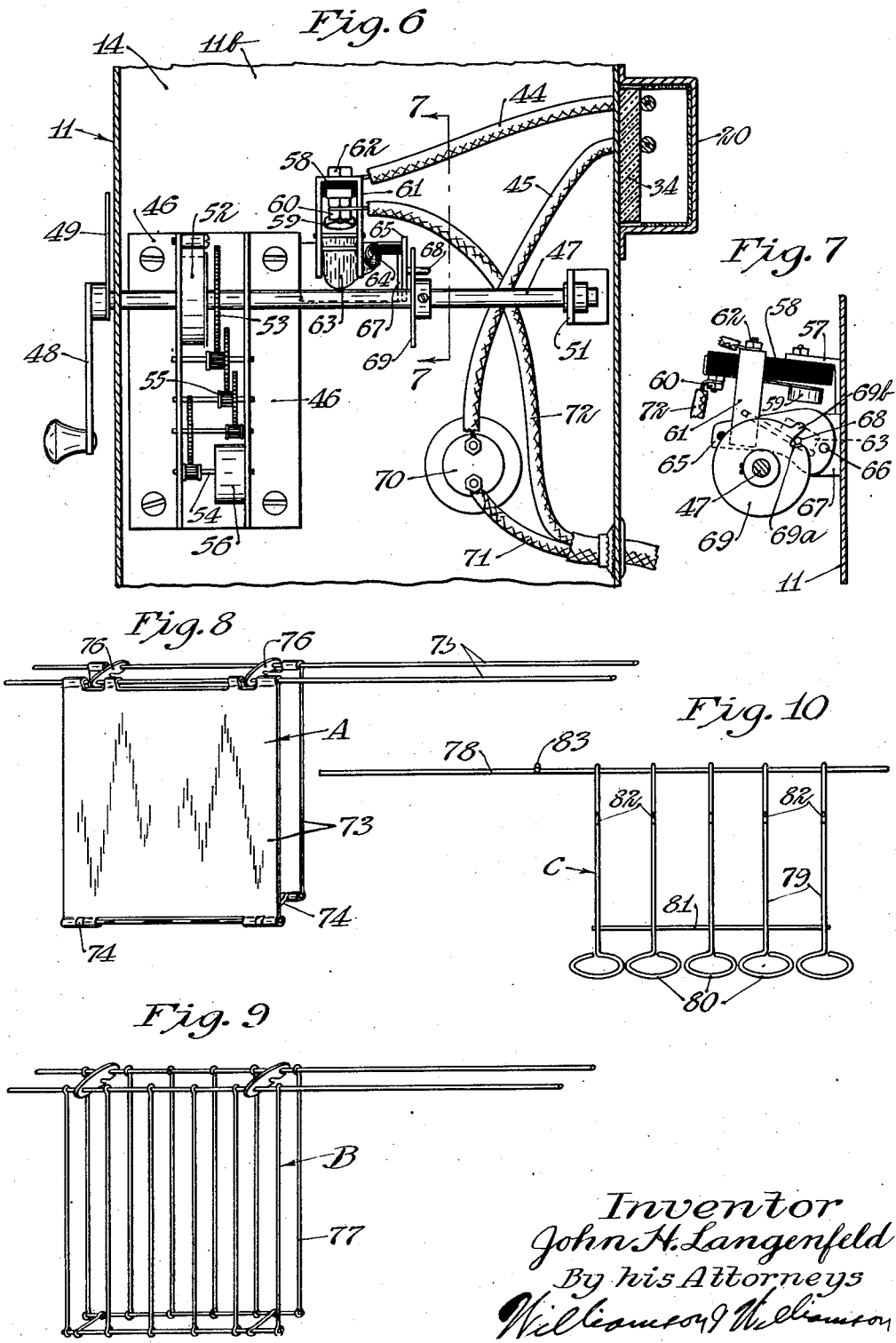

Patented Apr. 2, 1935

1,996,297

UNITED STATES PATENT OFFICE 1,996,297

ELECTRIC BARBECUE

John H. Langenfeld, Hastings, Minn.

Application April 27, 1933, Serial No. 668,151

7 Claims. (Cl. 219—19)

This invention relates to an electric barbecue for use in barbecuing meats of different type and for use in toasting sandwiches.

It is the general object of the invention to provide a novel and improved barbecue operated by electricity and of cheap and simple construction, the barbecue including electrical heating elements protected to prevent injury to the same from grease splattering from the meats cooked by the barbecue.

It is another object to provide a novel and improved heating element assembly, which can be readily removed for cleaning or for replacement of certain of the heating elements.

A further object is to provide a novel and improved time switch for use in the barbecue.

Yet another object is to provide novel holders for meats and sandwiches for use with the barbecue.

The objects and advantages of the present invention will more fully appear from the following description, made in connection with the accompanying drawings, wherein like reference characters refer to the same or similar parts throughout the various views, and, in which, Fig. 1 is a perspective view of the barbecue of the invention, two holders for meat or sandwiches being shown in use therewith;

Fig. 3 is a vertical section taken on the line 3—3 of Fig. 2 as indicated by the arrows;

Fig. 4 is a vertical section taken on the line 4—4 of Fig. 3, as indicated by the arrows;

Fig. 5 is a horizontal section taken on the line 5—5 of Fig. 4, as indicated by the arrows;

Fig. 6 is a vertical section taken on the line 6—6 of Fig. 2 as indicated by the arrows;

Fig. 7 is a vertical section taken on the line 7—7 of Fig. 6, as indicated by the arrows;

Fig. 8 is a perspective view illustrating one type of holder that may be used for cooking meats in the barbecue;

Fig. 9 is a perspective view showing a second type of holder that may be employed; and Fig. 10 is a view in side elevation illustrating a third type of holder that may be used for cooking wieners.

Figure 1:
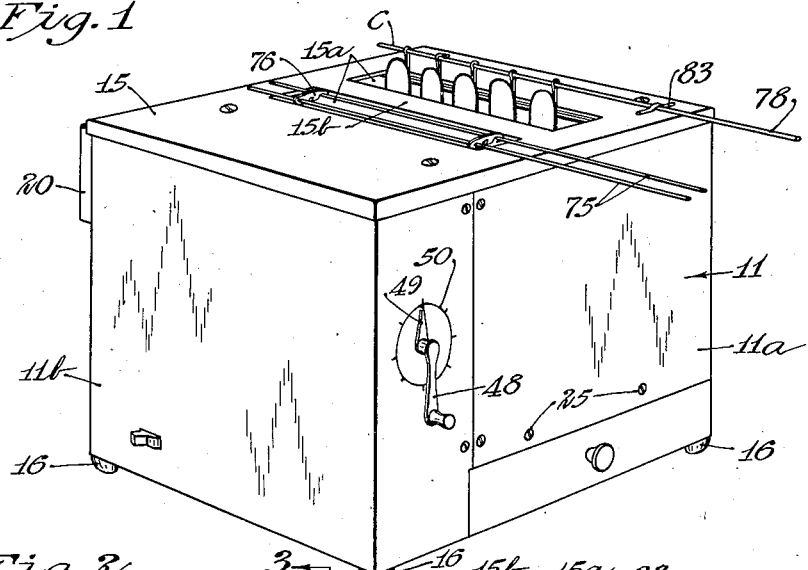

In accordance with the invention there is provided a rectangular casing 11 divided by a partition 12 into a large heating chamber 13 and a smaller switch chamber 14. In the illustrated embodiment, casing 11 is shown as being formed chiefly by two plates 11a and 11b, each of which is of general channel-shape in horizontal cross section. The ends of these plates are brought into abutment and are secured as by means of screws to side flanges formed on the partition 12. Closing the tops of the two chambers 13 and 14 is a top plate 15 secured to inturned flanges formed on the plates 11a and 11b at the ends of the casing and also secured to an inturned flange at the upper end of the partition 12. The two plates 11a and 11b are inwardly flanged at their bottoms at the ends of the casing and preferably hard rubber knobs 16 are secured to these flanges at the four corners of the casing to support the lower edge of the casing in upwardly spaced relation from a supporting surface. The inturned flange at the lower end of the plate 11a at one end of the casing forms a supporting guide 17 which cooperates with an inturned flange 18 at the lower end of the partition 12 to form a support for a grease drip pan 19, which can be slid inwardly and outwardly from the front of the casing 11 on the guides 17 and 18. This drip pan 19 normally substantially closes the bottom of the heating chamber 13, one side of the plate 11a being cut away at its lower portion to receive the outer end of the drip pan. Applied to the rear side of the casing 11 near its upper end is a longitudinally extending housing 20.

In the illustrated embodiment, the top plate 15 is shown as being provided with two spaced parallel transversely extending slots 15a, the material of the top plate between the slots forming a rib 15b. Any number of slots similar to the slots 15a may be provided in the top plate depending on whether it is desired to make the barbecue of large capacity or of small capacity. These slots 15a of course lead into the heating chamber 13. Below the top plate 15, a pair of bars 21 are removably attached to the sides of the casing as by means of screws 22. These bars are located at the top of the chamber 13 and extending transversely between and mounted in these bars 21 are three pair of transversely extending rods 23. One pair of these rods are disposed in closely spaced relation adjacent but to the left of the left hand slot 15a, as viewed in Fig. 2. Another pair of the rods are disposed in closely spaced relation immediately below the rib 15b, while the third pair of rods are disposed in closely spaced relation adjacent but to the right of the right hand slot 15a, as viewed in Fig. 2. Near the bottom of the chamber 13, a pair of bars 24 are secured as by screws 25 to the sides of the casing in oppositely facing relation and extending between and mounted in these bars 24 are three transverse rods 26. Each rod 26 is located below a pair of rods 23 midway between the two rods 23 above the same. A number of U-shaped rods 27 are provided which respectively run between a pair of rods 23 and the rod 26 below the same and each of these rods 27 has the function of a holder for a heating element and as a fender to prevent injury to the heating element held thereby. Eyes are formed at the ends of the rods 27 and the rods 23 project through these eyes. At their lower ends the rods 27 are crimped inwardly toward each other to form portions which encircle the rods 26 and closely spaced oppositely opposed spring shoulders 27a immediately above the rods 26.

Three electrical heating elements are provided and the two outer electrical heating elements may be designated by the numeral 28, while the inner heating element is designated by the numeral 29. The inner heating element 29 is of twice the capacity of the two outer elements 28 but otherwise the heating elements 28 and 29 are of very similar formation. Each heating element 28 and 29 includes upper and lower metal strips 30 to which mica sheets 31 are attached and ribbons 32 of electrical conducting material having high resistance are applied to the mica sheets. The ribbons 32 are so placed on the elements 28 that the major portions of the ribbons are disposed on the inner faces of the mica sheets 31, while the ribbons 32 are placed on the element 29 so that there is approximately an equal exposure of the ribbons on both faces of the mica sheets 31. The heating elements 28 and 29 bear at their lower ends against the rods 26 and are so situated at their lower ends that the shoulders 27a of the rods 27 will resiliently clamp and anchor the lower parts of the heating elements in the manner of spring clips. The upper ends of the heating elements 28 and 29 are disposed between pairs of rods 23 and bear against the eyes formed at the ends of the U-shaped rods 27. The ends of the ribbons of the heating elements project into the housing 20 through quite large openings 33 formed in the rear wall of the casing 11 adjacent the upper end of the chamber 13.

It will be seen that the bars 21, bars 24, rods 23, rods 26 and heating elements 28 and 29 form a unitary construction which can be removed from the casing 11 when the top plate 15 and the screws 22 and 25 are removed. These parts of course may be assembled together for insertion into chamber 13, as the barbecue is being assembled. It will also be seen that the heating elements 28 and 29 can be readily removed from and slipped into place within the holders formed by the rods 23, 26 and 27. Accordingly, worn or injured heating elements can be readily replaced or repaired.

Figure 2:
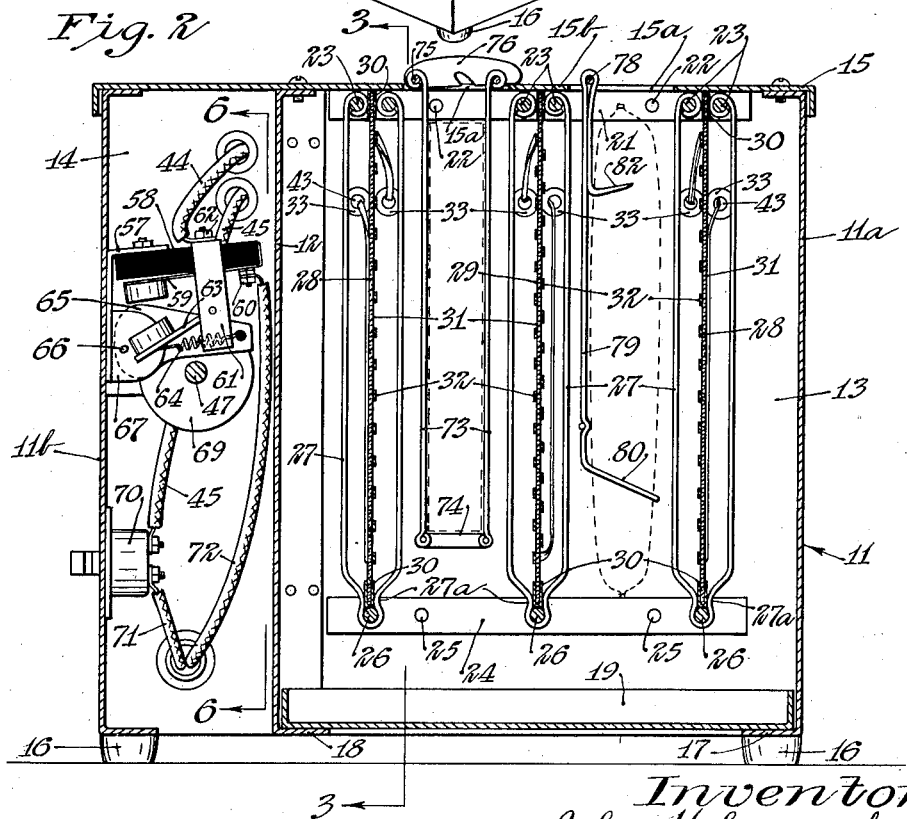
Fig. 2 is a vertical longitudinal section taken through the barbecue shown in Fig. 1.

Disposed within the housing 20 and mounted on the rear side wall of the casing 11 is a panel 34 formed of insulating material. This panel is best shown in Figs. 3, 4 and 5. Countersunk within this panel is an upper bar 35 formed of electrically conducting material and having a pair of binding posts 36 and 37. Also countersunk in the panel 34 are two shorter bars 38 and 39 formed of electrically conducting material. The bar 38 carries two binding posts 39a and 40, while the bar 39 carries two binding posts 41 and 42. Openings 43 concentric with but smaller than the openings 33 are provided in the panel 34 and the ends of the ribbons of the heating elements 28 and 29 run through the openings 43 without engaging the casing 11. One end of the ribbon 32 of the right hand heating element 28 as viewed in Fig. 2 is connected to binding post 36, while the other end of this ribbon is connected to binding post 39a. One end of the ribbon 32 of the left hand heating element 28, as viewed in Fig. 2, is connected to the binding post 37 while the other end of this same ribbon is connected to the binding post 42. One end of the ribbon of heating element 29 is connected to binding post 40 while the other end of this same ribbon is connected to binding post 41. Electrical conductors 44 and 45 are connected respectively to the binding posts 42 and 40 and run through openings in the rear wall of the casing 11 into the switch chamber 14. It will be seen that the two outer electrical heating elements 28 are connected in series and that the inner heating element 29 is connected in parallel with the outer elements. It will be understood that in place of the structure shown, any suitable means may be employed for connecting the outer heating elements in series and for connecting the inner heating element or elements in parallel with the outer elements.

Mounted on the end wall of the casing 11 within the switch chamber 14 are a pair of oppositely opposed angular brackets 46 within which a cross shaft 47 is journaled. This cross shaft projects through the front side of the casing 11 and carries a crank 48 equipped with a pointer 49 outwardly from the front wall of the casing. The pointer 49 works over a dial 50 printed or formed on the front side of the casing. The rear end of the shaft 47 may be suitably journaled in a bracket 51 mounted on the end wall of the casing 11. A watch spring 52 is anchored at one end to one of the brackets 46 and is secured at its other end to the shaft 47. A pinion 53 mounted on the shaft 47 between the brackets 46 drives a shaft 54 rotatably mounted in the brackets 46 through a suitable gear train 55 mounted in the brackets 46. The shaft 54 carries centrifugal arms (not illustrated) which act against a drum mounted on one of the brackets 46 and the drum and centrifugal arms together form a centrifugal brake or regulator 56 which controls the speed of rotation imparted to the shaft 47 by the spring 52 after the shaft 47 has been turned to tension the spring. Any other suitable clockwork mechanism may be substituted for the spring 52, pinion 53, gear train 55 and centrifugal brake 56 to cause rotation of the shaft 47 at a regulated speed in one direction after it had been turned in an opposite direction.

Mounted on the end wall of the casing 11 within the chamber 14 is a bracket 57, as best shown in Fig. 2, and carrying a block of insulation 58. Secured to this block 58 is an electrical switch contact 59 having a binding post 60. A U-shaped member 61 carrying a binding post 62 is also mounted on the block 58 in such relation that it has no engagement with the contact 59. Pivotally mounted on the U-shaped member 61 is a swinging switch contact 63 adapted for cooperative engagement with the contact 59. One end of a coiled spring 64 is connected to the swinging end of contact 63 and the other end of the spring is connected to the outer end of an arm 65 pivotally mounted on a pivot 66 carried by a bracket 67 secured to the end wall of the casing 11. This arm 65 carries an outwardly projecting pin 68 which normally fits within a notch 69a cut into the periphery of a disk 69 mounted on the shaft 47 along side of the arm 65. The disk 69 has a finger 69b which projects outwardly beyond the periphery of the disk to form a continuation of one wall of the notch 69a. A master switch 70 is mounted on the end wall of the casing 11 within the chamber 14 and this master switch has a control key projecting outwardly through an opening in the end wall. Running into the chamber 14 through an opening in one wall thereof are a pair of electrical conductors 71 and 72 respectively which may be connected outside of the casing 11 to a suitable source of electrical supply. The conductor 71 runs to one binding post of the switch 70, while the conductor 45 runs to the other binding post of the switch 70. Conductor 72 is connected to the binding post 60, while conductor 46 is connected to binding post 62.

For use in cooking meats, sandwiches, etc. in the barbecue, I have provided a number of different types of food holders of special construction. One of these is shown in Fig. 8. The holder A there shown includes a pair of spaced plates 73 pivotally connected together at their lower edges by means of links 74 and having secured to their upper edges rods 75 which project from both side edges of the plates. Latches 76 are pivotally mounted on one of the rods 75 between the side edges of one of the plates 73 and these latches have one or more hook-like notches which may be engaged with the other rod 75. The holder A is particularly adapted for cooking meats, such as ham, bacon, pork chops etc. In Fig. 9 there is shown a second type of holder B which is similar in all respects to the holder A with the exception that gratings 77 are substituted for the plates 73 of the holder A. The holder B is particularly adapted for use in cooking sandwiches, such as toasted cheese sandwiches etc.

In Fig. 10, a third type of holder C is illustrated and this holder is particularly adapted for use in cooking wieners in the barbecue. The holder C includes a long rod 78 having a plurality of downwardly extending rods 79 connected thereto, the rods 79 having loops 80 at their lower ends extending angularly to the main portions of the rods. The rods 79 may be connected together near their lower ends by means of a cross rod 81 and the rods are equipped with projecting points 82 downwardly spaced from their point of engagement with the rod 78. A short cross piece 83 is secured to the rod 78 outwardly from the rods 79. It should be noted that the rods 75 and 78 and the rods of the holder B, corresponding to the rods 75 of holder A, are quite long to form handles for the various holders.

The barbecue may be used for cooking many different types of food. If it is desired to cook a pork chop and wieners at the same time, for example, the holders A and C will be used. The pork chop may be inserted in place within the holder A by unlatching the latch bars 76, inserting the pork chop in place between the plates 73 and relatching the latch bars, whereupon the holder may be inserted through one of the slots 15a of the top plate of the barbecue, so that the holder takes the position shown in Figs. 1 and 2 between the two left hand heating elements 28 and 29. In this position, the rods 75 of the holder A rest upon the top plate 15, so as to suspend the holder with the pork chop adjacent to the heating elements. The holder C is used for cooking the wieners and in positioning the wieners in place on the holder, they are first inserted with their lower ends disposed through certain of the loops 80, whereupon the upper parts of the wieners are caused to be engaged by the points 82.

The holder C with the wieners attached may then be inserted in place within the barbecue by dropping the holder through the right hand slot 15a, as viewed in Figs. 1 and 2. The rod 78 will suspend the holder C from the top plate 15 with the wieners located between the two right hand heating elements 28 and 29. The food is now ready to be cooked and the barbecue may be set in operation.

The master switch 70 is turned on, whereupon the crank 48 is revolved in a clockwise direction to tension the spring 52 and cause the spring 52 to tend to move the shaft 47 in a counterclockwise direction. As the crank 48 is turned in a clockwise direction, the wall of the notch 69a of disk 69 will engage pin 68 of arm 65 to cause the outer end of this arm to swing upwardly until the pin 68 has been carried out of the notch 69a. As this occurs, the end of the spring 64 connected to the arm 65 will be carried upwardly beyond the dead center relation relative to the pivot of contact 63 and the spring will cause the contact 63 to snap into engagement with the contact 59. An electrical circuit will then be made from the source of electrical supply through conductor 72, contact 59, contact 63, U-shaped member 61, binding post 62, conductor 44, binding post 42, the left hand electrical heating element 28 as viewed in Fig. 2, binding post 37, bar 35, binding post 36, the right hand electrical heating element 28 as viewed in Fig. 2, binding post 39, bar 38, binding post 40, conductor 45, master switch 70 and conductor 71 back to the source of electrical supply. A parallel circuit will be established from binding post 41 through electrical heating element 29 to binding post 40. As the two electrical heating elements 28 are connected in series, and these elements are connected in parallel to the element 29, considerably more power will be supplied to the element 29 than to either one of the two elements 28 and the power supplied to the two elements 28 will equal the power supplied to the element 29. The electrical heating elements will, of course, heat up to supply heat evenly to the various portions of the heating chamber 13 and cook the food held within the holders. Current will continue to be supplied to the various heating elements until such time as the spring 52 rotates the shaft 47 in a counterclockwise direction to such a point that the pin 68 on arm 65 falls within the notch 64a of disk 69. As this occurs, the end of the spring 64 connected to the arm 65 will be swung downwardly past dead center relative to the pivot of contact 63 and the spring will snap the contact 63 downwardly to break the electrical circuit and cut off the supply of electricity to the heating elements 28 and 29. It will be understood that the spring 64 is so located that whether the arm 65 is swung upwardly or downwardly, the spring exerts resilient tension on the arm 65 to keep the pin 68 continuously in contact with the periphery of disk 69. The length of time for which the barbecue is set in operation can, of course, be determined by initially rotating the crank 48 in a clockwise direction through a greater or less arc. The pointer 49 acting in conjunction with the dial 50 form an indicator so that the time of operation of the barbecue can be properly gauged. The master switch 70 permits the electrical circuit to be broken at any time irrespective of the fact that the switch formed by the contacts 59 and 63 may be closed.

It should be noted that the rods 27 effectively protect the heating elements 28 and 29 to prevent injury being done to the same as the holders are inserted, or withdrawn from the barbecue. Also these rods prevent the food from being spaced too closely to the heating elements. Any grease that may be formed during the time that the food is being cooked will drip directly into the drip pan 19 where it may be collected and removed as occasion demands. The rods 26 and 27 offer but slight obstruction to the flow of grease and particles of food to the drip pan 19 and but very slight accumulation of grease and carbon form on these rods even after the barbecue is operated for a long period of time. It has already been explained that these rods may be readily removed for cleaning if desired.

Any one of the three types of holders A, B and C may be used for cooking the food in the barbecue. When the holder A is used, the plates 73 effectively prevent grease from spattering from the food onto the heating elements. This holder is also particularly effective for cooking bacon and thin slices of ham to prevent the same from curling.

It will be seen that a barbecue device of cheap and simple construction has been provided, which can, at all times, be kept sanitary. The device has been used in actual practice and has been found to be effective for the purposes intended.

It will, of course, be understood that various changes may be made in the form, details, arrangement and proportions of the various parts without departing from the scope of the present invention.

What is claimed is:—

1. An electric barbecue having in combination a compartment having side and end walls and a top provided with a transverse aperture through which food may be inserted, pairs of closely spaced upper rods running between said side walls immediately below said top, one pair of rods being disposed adjacent but spaced from one side of said aperture and the other of said pairs being disposed adjacent but spaced from the other side of said aperture, lower rods extending between said side walls below said upper rods and midway between each pair of upper rods and electrical heating elements resting at their lower ends against said lower rods and received adjacent their upper ends between the spaced rods of said pairs.

2. An electric barbecue having in combination a compartment having side and end walls and a top provided with a transverse aperture through which food may be inserted, pairs of closely spaced upper rods running between said side walls immediately below said top, one pair of rods being disposed adjacent but spaced from one side of said aperture and the other of said pairs being disposed adjacent but spaced from the other side of said aperture, lower rods extending between said side walls below said upper rods and midway between each pair of upper rods, U-shaped rods connected at their upper ends to said upper rods and running downwardly to embrace said lower rods, said U-shaped rods being crimped inwardly near their lower portions to form oppositely opposed resilient shoulders and electrical heating elements fitting between said shoulders, bearing at their lower ends against said lower rods and received between pairs of said upper rods.

3. An electric barbecue having in combination a compartment having side and end walls and a top provided with a transverse aperture through which food may be inserted, pairs of closely spaced upper rods running between said side walls immediately below said top, one pair of said upper rods being disposed adjacent but spaced from one side of said aperture and the other of said pairs being disposed adjacent but spaced from the other side of said aperture, lower rods extending between said side walls below said upper rods and midway between each pair of upper rods, U-shaped fender rods connected at their ends to said upper rods, embracing said lower rods at their lower ends and having inwardly crimped portions forming oppositely opposed clips and electrical heating elements received between pairs of said upper rods and between said clips of said fender rods and bearing at their lower ends against said lower rods.

4. An electric barbecue comprising a compartment having side and end walls and a top provided with a transverse aperture through which food may be inserted, pairs of closely spaced upper rods running between said side walls immediately below said top, one pair of said upper rods being disposed adjacent but spaced from one side of the said aperture and the other of said pairs being disposed adjacent but spaced from another side of said aperture, lower rods extending between said side walls below said upper rods, U-shaped fender rods connected at their ends to said upper rods, engaging said lower rods and having inwardly crimped portions forming oppositely opposed spring clips and electrical heating elements received between pairs of said upper rods and between said clips.

5. An electric barbecue comprising a compartment having side and end walls and a top provided with a transverse aperture through which food may be inserted, oppositely opposed upper bars removably attached to the side walls of said compartment, oppositely opposed lower bars removably attached to the side walls of said compartment below said upper bars, pairs of closely spaced upper rods running between said upper bars immediately below said top, one pair of said upper rods being disposed adjacent one side of said aperture, and the other of said pairs being disposed adjacent the other side of said aperture, lower rods mounted in and extending between said lower bars, U-shaped fender rods connected at their ends to said upper rods, engaging said lower rods and having inwardly crimped portions forming oppositely opposed spring clips and electrical heating elements received between pairs of said upper rods and between said clips.

6. An electric barbecue comprising in combination a compartment having an opening therein through which food may be inserted for cooking, electrical heating elements within said compartment, a switch chamber, a shaft mounted for rotation within said switch chamber, means for turning said shaft in a second direction after it has been originally rotated in a first direction, a disk mounted on said shaft, said disk having a notch cut in the periphery thereof, an electrical contact mounted in fixed relation in said switch chamber, a pivotally mounted electrical contact for cooperative engagement therewith, an electrical circuit adapted to be established through said heating elements when said two contacts are engaged, an arm pivoted adjacent said disk, a pin carried by said arm and adapted at times to be received within said notch and a spring connected at one end to said arm and at its other end to said pivoted contact and so positioned as to urge said pin into engagement with the periphery of said disk and at the same time to produce snap action of said movable contact relative to said fixed contact to carry the two contacts into and out of engagement as said arm is raised and lowered, said pin being adapted to be carried out of said notch to raise said arm and throw said movable contact into engagement with said fixed contact as said shaft is rotated in the first direction.

7. An electric barbecue comprising a compartment having a top provided with an elongated aperture through which food may be inserted, electrical heating elements in said compartment laterally spaced from the sides of said opening and projecting downwardly from said top in parallel spaced relation, cross rods disposed one at either side of each heating element adjacent the top of the compartment to receive a heating element between the same and a cross rod disposed midway between each pair of said first mentioned rods below the same and upon which the lower ends of said heating elements rest.

JOHN H. LANGENFELD.